United States Patent [19]
Malks

[11] Patent Number: 5,529,313
[45] Date of Patent: Jun. 25, 1996

[54] FRANGIBLE GASKET ALIGNMENT DEVICE FOR MOLDED GASKETS

[76] Inventor: Josh B. Malks, 1802 Frobisher Way, San Jose, Calif. 95124

[21] Appl. No.: 378,677

[22] Filed: Jan. 25, 1995

[51] Int. Cl.$^6$ .................................................... F16J 15/06
[52] U.S. Cl. ................ 277/11; 277/235 B; 277/DIG. 10; 123/195 C
[58] Field of Search .................................. 277/11, 235 B, 277/DIG. 10; 123/195 C, 195 S; 29/418

[56] References Cited

U.S. PATENT DOCUMENTS

| | | | |
|---|---|---|---|
| Re. 24,065 | 10/1955 | Bergstrom | 277/11 |
| 1,921,379 | 8/1933 | Bailey . | |
| 2,826,807 | 3/1958 | Harris . | |
| 3,198,323 | 8/1965 | Alberti et al. | 277/11 |
| 3,447,229 | 6/1969 | Clark | 29/418 |
| 4,101,138 | 7/1978 | Gaggiano | 277/11 |
| 4,730,836 | 3/1988 | Miller et al. . | |
| 4,784,396 | 11/1988 | Scott et al. . | |
| 4,819,954 | 4/1989 | Fucci et al. | 277/235 B |
| 5,044,641 | 9/1991 | Belter . | |
| 5,083,801 | 1/1992 | Okano et al. . | |
| 5,094,194 | 3/1992 | Rush, II et al. | 277/235 B |
| 5,186,591 | 2/1993 | Malks . | |
| 5,333,884 | 8/1994 | Miyaoh et al. . | |

FOREIGN PATENT DOCUMENTS

| | | | |
|---|---|---|---|
| 3321425 | 12/1984 | Germany | 277/235 B |
| 3610541 | 10/1987 | Germany | 277/235 B |

*Primary Examiner*—Scott W. Cummings
*Attorney, Agent, or Firm*—David H. Jaffer

[57] ABSTRACT

A self aligning gasket having holes for passage of securing devices such as bolts, for joining parts together with the gasket positioned in between. A plurality of alignment pins are integrally attached to a fragile connective member to edges of a plurality of the holes formed through the gasket. The pins are installed through corresponding clearance holes in the parts to be joined. Once the parts are secured together, the pins are removed by breaking or cutting the fragile connective members, exposing the corresponding part clearance holes, making them available for their originally intended use.

4 Claims, 1 Drawing Sheet

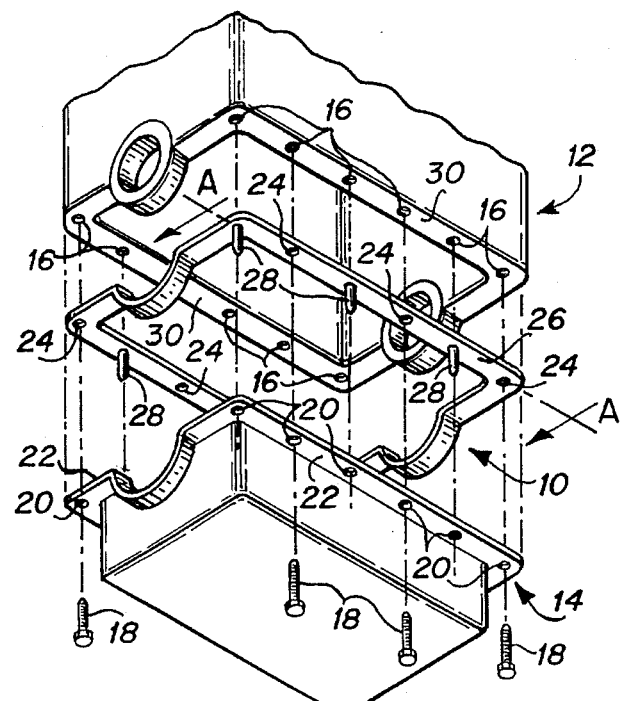
Fig_1
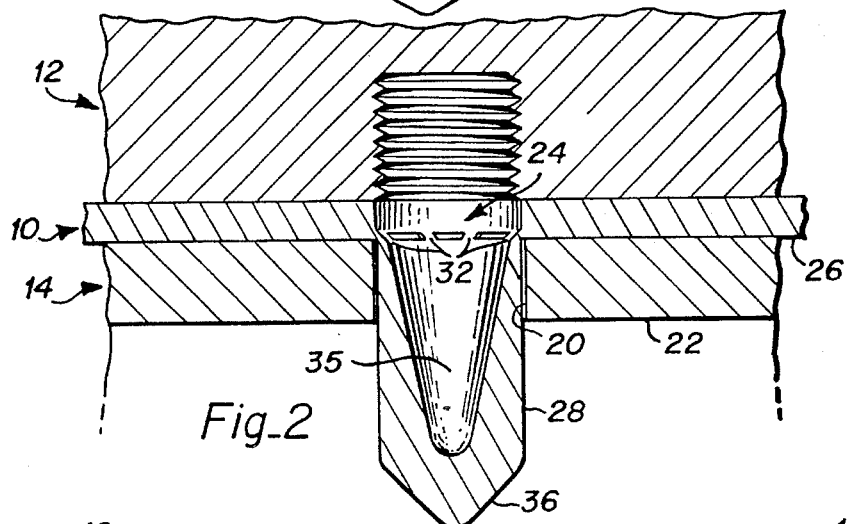
Fig_2
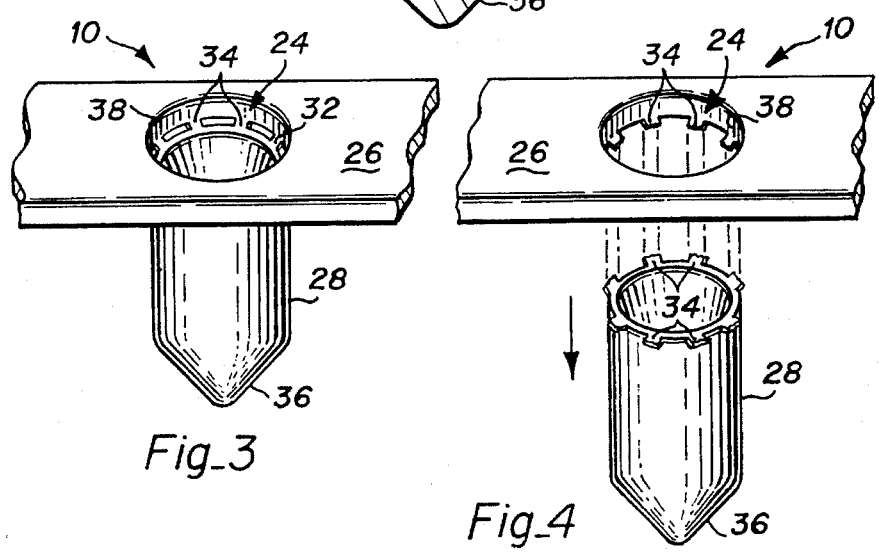
Fig_3
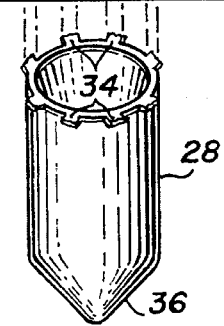
Fig_4

FRANGIBLE GASKET ALIGNMENT DEVICE FOR MOLDED GASKETS

BACKGROUND OF THE INVENTION

1. Field of the Invention

The present invention relates generally to gaskets, and more particularly, to a gasket with alignment pins integrally formed with the gasket and allowing for alignment pin removal after gasket assembly with parts to be sealed.

2. Brief Description of the Prior Art

The installation of gaskets is often difficult due to problems in alignment of the various parts. This situation is most severe with large flexible gaskets, such as those used to seal automotive oil pans. A number of devices for aligning gaskets have been the subject of patents in the prior art. U.S. Pat. No. 5,333,884 by *Miyaoh*, et al. discloses a metal plate gasket for sealing engine parts. It uses clip retainers extended at right angles from the sides for securing the gasket to one of two engine parts. The gasket is rigid in nature and the clips are permanently attached.

U.S. Pat. No. 5,083,801 by *Okano*, et al., provides for alignment of a rigid gasket through use of dowel pins secured in one of the parts to be sealed. The gasket has corresponding holes with interfering members for gripping the dowel pins, facilitating alignment as well as holding the gasket in place.

An oil pan gasket is disclosed in U.S. Pat. No. 4,784,396 by *Scott*, et al. This gasket includes plastic sleeves configured to protrude into bolt holes through the oil pan. The sleeves have interior annular ridges or teeth upon which an oil pan bolt can grip, thereby securing the bolt, pan, and gasket together and providing alignment during assembly.

Another approach to oil pan gasket alignment is described in U.S. Pat. No. 5,044,641, by *Belter*, wherein thin sleeves are attached to the gasket, dimensioned for an aligning fit in corresponding counter bores to bolt holes in the engine block.

Although the alignment devices of the prior art have solved many gasket alignment problems, there is still a need for an effective, economical gasket alignment device, particularly in the case of the large flexible type of gaskets such as those used on automotive oil pans.

For example, the alignment means of *Miyaoh* and *Okano* are designed for use with rigid gaskets. The *Miyaoh* device includes clips that are not removable, the use of which depends on a particular type of engine geometry for receiving the clip. The *Okano* device requires the use of dowel pins attached to the engine block, and a gasket complicated by separate layers including interfering members for gripping the pins. The *Scott* and *Belter* inventions both use permanent sleeve shaped members attached to the gasket, making manufacture more complicated, and requiring specially designed engine parts for use with the gasket.

There is clearly a need for a gasket that can be used on preexisting part designs such as automotive engine block and oil pan assemblies that is inexpensive and provides for gasket alignment. Such a device is particularly needed in situations where the gasket is large and flexible, a condition making it very difficult for the assembler to keep the gasket from moving out of position during assembly.

SUMMARY OF THE INVENTION

It is, therefore, an object of the present invention to provide an improved gasket providing self alignment.

It is a further object of the present invention to provide an improved gasket providing self alignment that is of one piece molded construction.

It is another object of the present invention to provide an improved gasket having means for alignment with existing designs of parts to be sealed together.

Briefly, a preferred embodiment of the present invention includes a self aligning gasket for sealing mating surfaces of parts to be joined together, such as an engine oil pan to an engine block. There are holes through the gasket for passage of securing devices such as bolts, for joining the parts together with the gasket positioned in between. These holes in the gasket correspond to clearance holes in one of the parts to be joined, the clearance holes normally provided for passage of securing devices such as bolts. A plurality of alignment pins are integrally attached to the gasket, each pin having a connective end interconnected by means of a fragile connective member to the perimeter of a corresponding gasket hole. The pins extend away from the gasket, and in operation are installed through corresponding clearance holes in one or more of the parts to be joined, thereby securely aligning the gasket. The parts are then secured together by the fasteners through the clearance holes that remain unoccupied by alignment pins. With the parts in place, the pins can be removed by breaking or cutting the fragile connective members, and with the pins removed, the corresponding part clearance holes are exposed and available for their originally intended use, such as for bolts securing the parts together.

One advantage of the present invention is that it provides a one piece self aligning gasket that is economical to manufacture.

Another advantage of the present invention is that it can be used with existing part designs, using existing part clearance holes, and not requiring part redesign.

A further advantage of the present invention is that the alignment pins, used in existing clearance holes, can be removed following initial assembly, allowing the holes to be used for their originally intended purpose.

IN THE DRAWING

FIG. 1 illustrates a preferred embodiment of the present invention used to seal an engine oil pan to an engine block;

FIG. 2 is an enlargened cross sectional view of one of the alignment pins shown in FIG. 1;

FIG. 3 is a view of a portion of the gasket illustrating a fragile connective member; and FIG. 4 shows the alignment pin of FIG. 3 disconnected from the fragile connective member.

DETAILED DESCRIPTION OF THE PREFERRED EMBODIMENT

Referring now to FIG. 1 of the drawing, there is an exploded view showing an embodiment of the self aligning gasket 10 of the present invention in application for sealing an engine block 12 to an oil pan 14. The block 12 has tapped holes 16 for receiving bolts 18 inserted through corresponding clearance holes 20 in a rim 22 of the oil pan 14, and holes 24 in the seal portion 26 of gasket 10. A selected number of holes 24 are obscured from view in FIG. 1 by alignment pins 28 which are integrally formed with the gasket seal portion 26 by way of a fragile connective member (not shown) to the sides of the selected holes 24. The fragile connective member will be fully described in the following detailed description of the figures of the drawing.

In operation, a mechanic places the gasket 10 on the oil pan rim 22 with the pins 28 inserted through the corresponding number of clearance holes 20. The pins 28 align and retain the gasket 10 on the oil pan rim 22 as the mechanic places the oil pan 14 and gasket 10 assembly against the block 12 sealing surface 30. The bolts 18 are then inserted through the holes 20 that are not occupied by pins 28, and through corresponding holes 24 in the seal portion 26 of the gasket 10, and threaded into the corresponding tapped holes 16 in the block 12.

With the oil pan 14, gasket 10 and block 12 secured together, the pins 28 are removed by breaking or cutting the fragile connective members. The removal of the pins exposes the holes 24 which had been filled by the pins. The remaining bolts 18 are then installed through the corresponding holes 20, 24, and threaded into the corresponding tapped holes 16.

Although FIG. 1 shows a gasket 10 in use for sealing an oil pan 14 to an engine block 12, the invention also includes any number of other applications wherein a gasket of any shape is aligned with a part by means of detachable pins integrally formed with the gasket for insertion through existing part holes originally intended for bolts or other purposes. According to the spirit of the invention, the pins serve temporarily for alignment, and then after initial assembly of the parts, are removed, allowing the holes to then be used for their originally intended purposes.

FIG. 2 is an enlarged cross-sectional view of one of the pins 28 along Line A of FIG. 1, shown inserted through one of the holes 20 in the oil pan rim 22. The seal portion 26 of the gasket 10 is shown clamped between the rim 22 and the block 12. The fragile connective member 32 is shown to be a very thin section connecting the pin 28 with the seal 26. This thin section can be a continuous connection around the circumference of the edge of the hole 24, or it can be a series of connective parts, the details of which will be fully explained in the following descriptions of the drawing. The pin 28 is shown to have a cavity 35 and a tapered end 36. The tapered end 36 is for guiding the pin into the hole 20 in the rim 22. The cavity 35 is a design choice involved in the manufacture of the gasket 10, preferably accomplished by molding. Both the cavity 35 and the tapered end 36 are optional features of the invention. The pin 28 can be removed by either pulling and/or twisting, or through use of a cutting tool of various designs well-known to those skilled in the art. For example, a thin-walled tubular cutting tool could be inserted over the pin 28 and along the gap between the pin 28 and edge of hole 20.

FIG. 3 is a view of a portion of the gasket illustrating a fragile connective member 32 consisting of a plurality of thin segments 34 connecting the pin 28 to the wall 38 of the hole 24. FIG. 4 shows the pin 28 removed from the seal portion 26 by breaking or cutting the segments 34, exposing the hole 24. As mentioned above, the fragile connective member 32 can be of various configurations. The width and number of segments 34 is a matter of design choice, and includes a single continuous member, or any number of members spaced around the circumference of the hole 24.

Although the present invention has been described above in terms of a specific embodiment, it is anticipated that alterations and modifications thereof will no doubt become apparent to those skilled in the art. It is, therefore, intended that the following claims be interpreted as covering all such alterations and modifications as fall within the true spirit and scope of the invention.

What is claimed is:

1. A self aligning gasket, for use with parts having a plurality of part clearance holes, said gasket comprising:

(a) a seal portion for placement between said parts, the seal having a plurality of seal clearance holes therethrough, each seal clearance hole having a perimeter, with said seal clearance holes corresponding to and spaced for alignment with said plurality of part clearance holes;

(b) a plurality of alignment pins, each having a connective end for attachment to a different seal clearance hole perimeter; and (c) fragile connective means for attaching each of said connective ends of said alignment pins to a different seal clearance hole perimeter;

whereby said pins are operative to provide alignment of said gasket and are removable by severing said fragile connective means after joining of said parts, whereby said seal clearance holes and said part clearance holes are available for another user selected purpose.

2. A self aligning gasket as recited in claim 1 wherein each said fragile connective means includes a fragile extension means extending from said perimeter and joining said alignment pin.

3. A self aligning gasket as recited in claim 1 wherein each said fragile connective means includes a plurality of fragile extensions of said seal portion of said gasket, said plurality of fragile extensions extending from said perimeter and joining said alignment pin.

4. A self aligning gasket as recited in claim 1 wherein each said alignment pin has a tapered end opposite to said connective end, said tapered end tapered so as to guide said pin into a corresponding said part clearance hole.

* * * * *